Nov. 2, 1926.                                                1,605,471
C. SCHENK
SIGNAL SYSTEM
Filed Sept. 18, 1925        3 Sheets-Sheet 1

Inventor
Carl Schenk.
by Hazard and Miller
Attorneys.

Nov. 2, 1926.  1,605,471
C. SCHENK
SIGNAL SYSTEM
Filed Sept. 18, 1925   3 Sheets-Sheet 2

Inventor:
Carl Schenk.
By Hazard and Miller
Attorneys.

Witness:

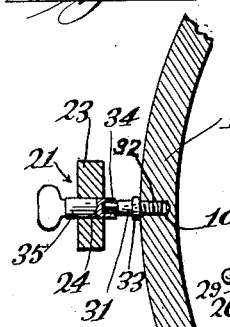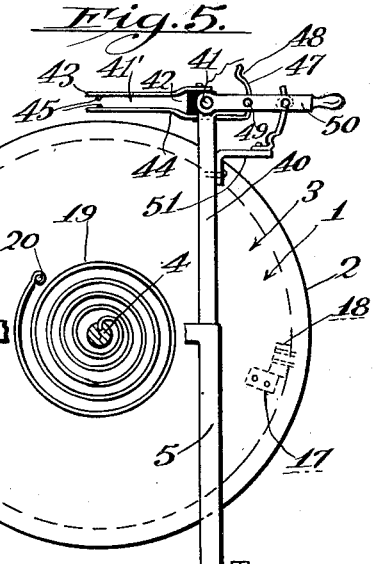

Patented Nov. 2, 1926.

1,605,471

UNITED STATES PATENT OFFICE.

CARL SCHENK, OF LOS ANGELES, CALIFORNIA, ASSIGNOR OF ONE-HALF TO THOMAS MILLEN, OF LOS ANGELES, CALIFORNIA.

SIGNAL SYSTEM.

Application filed September 18, 1925. Serial No. 57,147.

My invention is a signal system adapted for hotels, to give a call signal to guest rooms mechanically and automatically operated to call a guest at any desired hour in the day in accordance with the predetermined setting of the mechanism employed.

An object of my invention is to provide a time operated device which may have settings placed therein by a hotel clerk in accordance with the desired time of day that a guest desires to be called. Electrical controls are then operated automatically by the device so set by the clerk to ring a bell or give a signal in a guest room, which signal will operate until the guest responds by giving a return signal which stops his bell ringing and indicates to the hotel clerk that the guest has been called and acknowledges the call.

In the construction of my invention I employ a drum which is time operated to rotate once in the twenty-four hours of a day. This drum is provided with a series of longitudinal spacings for each of the rooms of the hotel and has a signal equipment which is circumferentially divided into hours and subdivisions of the hours as may be required. These subdivision points are provided with screw threaded sockets in which pins may be inserted to designate the particular room and the particular hour of the day the signal is to be given.

Another feature of my invention comprises a positive drive for an end plate which is loosely connected to the drum whereby the drum may be manually rotated forward to set the pins at any desired point, giving the hotel clerk a clear view of the cylinder and its time indication when setting the calling pins.

Another feature of my invention comprises electric circuits requiring the setting of the indicators in the office and with a pin on the drum establish an electric circuit to the guest room and give a ring in the room as well as actuating an indicator to show that the signal has been transmitted. The bell will continue ringing in the room until the guest closes the switch giving a return signal in the office acknowledging his call and opening the circuit stopping the bell from ringing. The circuits also allow direct communication between the room and the office independent of the signal system.

My invention will be more readily understood from the following description and drawings, in which;

Fig. 5 is an end view opposite to Fig. 3 taken on the line 5—5 of Fig. 2.

Fig. 6 is a detail section showing a detail of the frame and pin setting device to install the pins in the drum.

Fig. 7 is a diagrammatic view of the electric circuits in the office and in the guest room, showing the annunciators in the office to indicate the transmission of a call and acknowledgment thereof.

Figure 1:
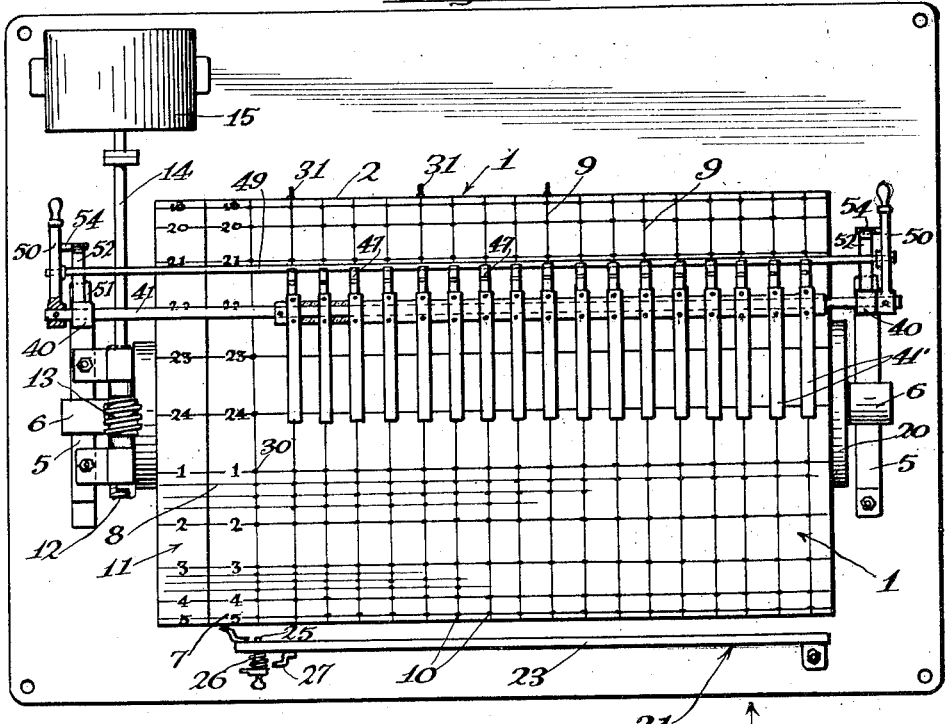
Figure 1 is a plan view of part of the office installation, showing the setting drum with the driving mechanism therefor and the primary circuit closers.
Figure 2:
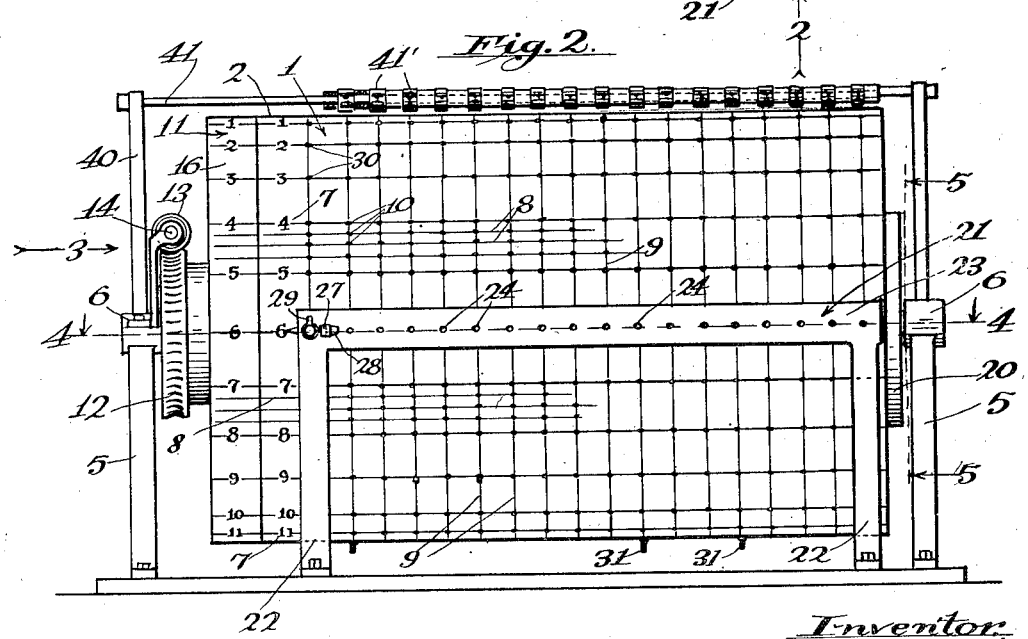
Fig. 2 is a front elevation of Fig. 1 in the direction of the arrow 2, illustrating in particular the frame for restraining the drum and setting the pins.

The mechanism will be first described as to the office equipment and in particular the construction and operation of the setting drum and associated mechanism. The setting drum is designated generally by the numeral 1 and has a cylindrical periphery 2 with heads 3 which rotate loosely on a shaft 4, the latter being supported by brackets 5, having journals 6 at their upper end. The drum is evenly divided peripherally into twenty-four sections and has indices 7 for the hours or time lines, with sub-indices 8 for times between the hours. A drum is marked off lengthwise with a plurality of lines 9 corresponding to each room having a call signal. At the intersection of the time lines and the room lines are screw threaded sockets 10.

Figure 4:
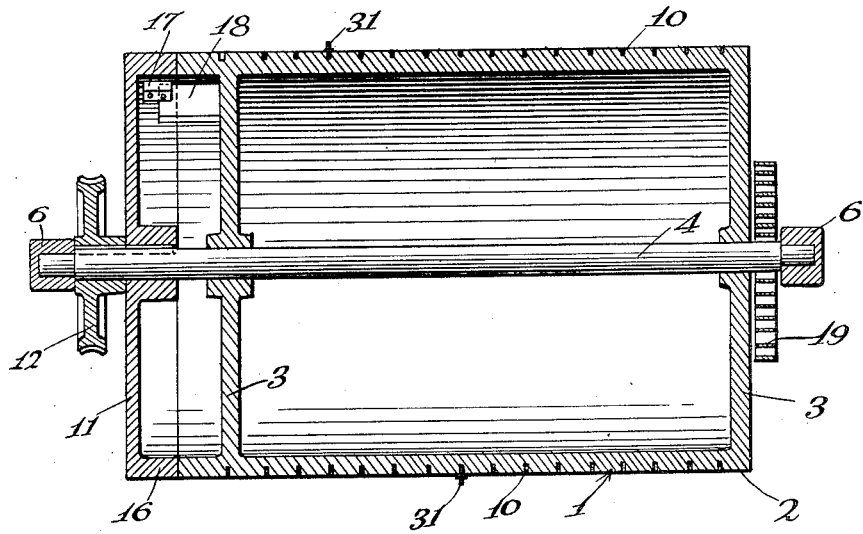
Fig. 4 is a horizontal cross section of Fig. 2 on the line 4—4, showing the construction of the drum and the driving plate on one end thereof.

A face plate 11 is keyed to the shaft 4, the latter being driven by a worm gear 12 also keyed to the shaft; this latter being driven by a worm 13 on a worm shaft 14, the latter being driven by a time clock 15 which may be of the electrically operated type to give a correct transmission of the time as well as to supply sufficient power to move the setting drum and associated mechanism. The face plate 11 is provided with a flange 16 to which is secured an abutment block 17. This latter engages with an abutment 18 secured to one of the heads 3. On the other end of the drum is a spirally coiled spring 19 (see Figs. 4 and 5), which is secured to the shaft 4 and engages the pin 20 on the outside of the head 3 opposite to that having the abutment 18. This spring is normally tensioned to hold the abutments one in contact with the other, but the drum may be rotated to separate the abutments and allow free inspection of any of the time and room sockets as well as for the purpose of setting the indicating pins as will be hereafter described.

The arrangement for setting the indicating pins in the socket 10 is substantially as follows:

A frame generally designated by the numeral 21 is shown particularly in Figs. 1, 2, 3, 5 and 6 and comprises a pair of legs 22 having a cross bar 23 connected thereto. This bar has a series of holes 24 therethrough, these being spaced to cover the room lines 9 and to allow the setting of the pins. A holding pin 25 is positioned adjacent one end of the bar 23 and has a spring 26 normally retracting the pin from the sockets in the setting drum. A slide block 27 operating in a slot 28 is adapted to be pressed laterally to engage the flange 29 of the pin 25 and hold this in any one of the sockets 30 arranged peripherally around the drum.

The pin inserter device is indicated in Fig. 6 in which the pins 31 are indicated as being screw threaded at one end 32 and having a flange 33 and a squared head 34. This latter is adapted to be engaged by a key 35, the latter fitting through the holes 24 in the bar 23 and allow the screwing of the pins into place in the sockets 10 on the drum.

The manner of setting the pins is substantially as follows:

It will be understood that the drum is continuously rotated by the timing clock 15 the full twenty-four hours of the day and day after day, and in order to set a single or a plurality of pins to indicate calls at different hours of the day or night the clerk may by clasping the periphery of the drum rotate it on the shaft 4 in the direction of the drive, advance the hour line or lines desired into proper position in relation to the bar 23. This arrangement allows ready access to any of the hour lines on the drum and to any of the sockets indicating the hours or portions of an hour. When the drum is thus manually moved to its proper position, the holding pin 25 is thrust into a holding socket 30 and retained therein by the slide block 27. The drum will then be held stationary while the clerk inserts the pin or a set of pins through the holes 24 in the bar in the particular room lines desired; or he may set the pins at the various hour lines on the drum which are readily accessible. When the holding pin 25 is released the spring 19 will rotate the drum backwardly and the abutments 17 and 18 contact and the drum will then be continuously rotated through the medium of the end plate 11.

The primary circuit closers are associated with the drum, being shown particularly in Figs. 1, 2, 3 5 and 7. A pair of standards 40 are secured to the brackets 5 and carry a longitudinal shaft 41. This shaft has a series of primary contact fingers 41' which are secured to short insulating blocks 42; these latter blocks having conducting contact springs 43 and 44 with the contacts 45 at the end thereof forming the fingers. The lower spring 44 has a rearward extension 46 and is bent upwardly, forming a holder spring 47 having a plurality of indentations 48. A cross rod 49 attached to lever arms 50 secured to the rock shaft 41 and located on opposite ends of the drum is positioned to engage the indentations 48 and to retain the primary contact fingers in their lower position shown in Fig. 3 adjacent the drum or tilted up.

Figure 3:
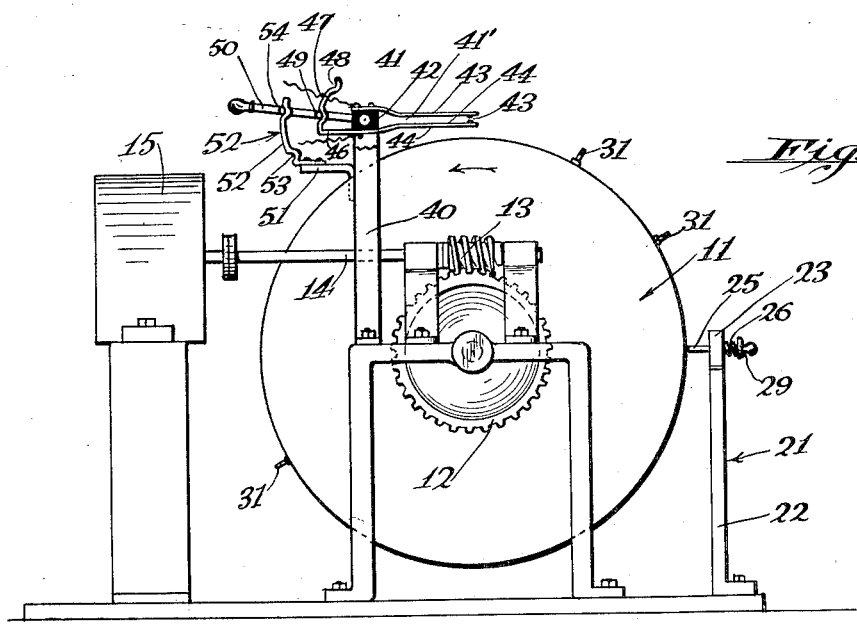
Fig. 3 is an end view of Fig. 2 in the direction of the arrow 3, showing the drive mechanism for the drum and the rocking lever for setting the primary circuit closing fingers.

A pair of brackets 51 are secured to the standards 40 and have holding springs 52 with recesses 53 which are adapted to engage a cross rod 54 extending between the lever arms 50. In view of this manner of supporting the primary contact fingers, when the lever arms 50 are rocked downwardly from the position shown in Fig. 3 the cross rod 49 rocks the fingers to remove the outer ends of the fingers from operative relation to the drum. Thus all the fingers may be rocked from a position contiguous to the drum to a position elevated thereabove or any one of the fingers may be manipulated by rocking until the rod 49 forming a holding device, engages the indentations 48. When the fingers are in their lowered position they are positioned to contact with the pins on the drum as shown in Figs. 3 and 5 and thus force the contact points 45 together, these points being naturally spaced apart and when the fingers are rocked upwardly the pins pass underneath without operating the contact points.

The electric signaling and annunciator mechanism with the circuits is substantially as follows, being illustrated diagrammatically in Fig. 7:

A segment of the drum 1, showing one of the pins 31 is illustrated being about to form a contact with the primary circuit closer fingers 41. When the contact points 45 are brought together by the engagement of the pin 31 with the fingers, a circuit is established from the source of power indicated by the numeral 50', through the springs 43 and 44 of the fingers, the line 51' through the separable spring contacts 52' which are shown closed in the manner hereafter described. The current then follows the lead 53' and 54' through the second relay 55, the room wire 56 to the bell 57 and returns to the wires 58 and 59 to the source of power.

When the pins are set in the setting drum or at a convenient time prior to that of the desired call the first relay 60 is set by having the room return annunciator 61 which is formed on a lever 62 placed into engagement with a hook 63 attached to an armature 64. This annunciator is arranged to force the contact points 65 of the spring contacts into engagement when the relay is set as shown in this figure. At the same time the room annunciator 61 is set the signal annunciator 66 should likewise be set. As these annunciators can be used for individual personal signals between the office and the guest or vice versa as hereafter described, this annunciator should always be reset immediately after it functions as hereafter described to give an annunciator indication. This annunciator 66 comprises a lever 67 engaging a hook 68 formed on a bell crank with the armature 69 of the relay 55.

When a signal has been given by means of a contact pin on a setting cylinder to a particular room, the electro-magnet of the second relay 55 will draw the armature 69 and release the setting annunciator 66, showing the clerk in the office that the call has been transmitted to the room. The bell 57 will continue ringing until stopped by the guest in the following manner: A switch 70 has as one branch of its circuit a return line 71 leading to an office bell 72 and by a lead 73 to one side of the source of power 50. The other branch of the circuit 74 leads to the first relay 60 and through the lead 75 and wire 59 to the opposite side of the source of power. When this relay 60 is thus energized the armature 64 is drawn towards the electro-magnet and releases the lever 62 from the hook 63, dropping the room return annunciator 61 which shows the hotel clerk that the guest has given an answer signal acknowledging the receipt of his call. When this annunciator drops, the contacts 65 are sprung apart opening the call circuit which includes the line 51' and the lead 53'.

For an individual signal between the room and the office the guest may close his switch 70 and transmit a signal to the bell 72 which will operate the annunciator 61 after it has been set in the manner above described and also ring the bell 72. The clerk in the office may then close the switch 76 which has in its circuit the leads 77 passing through the relay 55 to the room wire 56, ringing the bell 57, thence through the wires 58 and 59 to the source of power and leads 73 and 78 back to the switch 76. When this relay 55 is operated the annunciator 66 is dropped in the manner above described, showing that the clerk has responded to the guest's signal. This set of individual signals may be operated independently in opposite directions, that is, the office may signal the guest or the guest signal the office and the signal being indicated by both the annunciators 61 and 66, it being understood that these should be re-set after each drop or action of the annunciator. Although not indicated, the signals in the room and the office may be in the form of telephones.

Thus it will be seen that with my system of hotel signals the pins may be set in the setting drum to give a signal to any individual room at practically any desired hour of the day or night and that when the signal is automatically transmitted through the medium of the clock mechanism operating the drum, an indication is given in the office of the transmission of the call and when the guest responds by acknowledging the call an indication is likewise given in the office. Moreover, the circuits leading between the office and the room may be utilized for personal calls from the guest to the office or vice versa and may be incorporated in the ordinary telephone circuit between guest rooms and hotel offices.

My invention may be materially changed in its general features or specific details to be applicable to many different requirements other than the hotel use as described above. The mechanical features as well as the electrical details may thus be considerably altered without departing from the spirit of my invention as represented in the general description, drawings and as set forth in the claims.

Having described my invention, what I claim is:

1. A signal system comprising in combination a shaft a drum located in the office, loosely rotatable on said shaft, a driving plate connected to the shaft, a timing mechanism for rotating said plate, means for transmitting motion from the plate to the drum, a spring between the shaft and the drum, a series of sockets in the periphery of the drum, said sockets indicating particular rooms and different times of the day, a series of pins inserted in the socket to give calls to particular rooms at certain definite times, an electrically operated call signal in the rooms, a series of contact fingers mounted adjacent the drum adapted to be engaged by the pins, said fingers when so engaged forming an electric circuit to the particular rooms and operating the call signal.

2. A signal system as claimed in claim 1, the said spring allowing advancement of the drum in relation to the plate, and means to hold the drum so advanced while the pins may be inserted in the sockets in the drum.

3. In a signalling system, a setting drum having a series of sockets in its periphery, said sockets being positioned to represent particular rooms and particular times of the day, a time operated mechanism to rotate said drum, a series of electrically connected contact fingers, each having a pair of springs with contacts positioned adjacent the drum, a series of pins in certain of the sockets, the said pins operating the fingers on rotation of the drum to press the spring contacts together and transmit electrical call signals to particular rooms, means to rock any of the individual fingers out of engagement with the pins, and means to rock all the fingers simultaneously out of engagement with the pins.

4. In a signal system, a setting drum having a plurality of sockets in its periphery, adapted to indicate definite times and particular rooms, a shaft on which said drum rotates loosely, an end face plate operatively connected to the drum to force said drum in a forward direction, time operated means to rotate the end face plate, a spring operatively connected to the drum and to the shaft to allow advancement of said drum, a setting bar positioned adjacent the drum, means in said bar to engage some of the sockets to hold the drums stationary and a series of holes through the bar allowing insertion of the pins in the sockets registering therewith.

5. In a signal system, a setting drum having a plurality of sockets in its periphery, a setting bar positioned adjacent the drum, means on said bar to engage the drum and hold same stationary, there being a series of holes through the bar allowing insertion of pins in the sockets registering therewith.

6. A signal system comprising a shaft a drum loosely rotatable on said shaft, a driving plate connected to the shaft, inter-engaging means between the plate and the drum to rotate same in a forward direction, a spring connected between the shaft and the drum, said spring allowing the drum to be rotated ahead of the plate and to return same with the engaging means into contact, there being a series of sockets in the periphery of the drum, pins inserted in the sockets, an electric operative signal and a series of contact fingers mounted adjacent the drum to be engaged by the pins, said fingers completing the electric circuit to the signal.

7. In a signal system, a setting drum having a plurality of sockets in its periphery, a driving means for said drum, said drum being arranged for movement ahead of its driving means, a setting bar positioned adjacent the drum having a series of holes therethrough, means on the bar to engage the drum and hold same stationary, and pins insertable through the holes in the bar into the sockets of the drum.

8. A signal system comprising in combination a shaft, a drum loosely rotatable on said shaft, a driving plate connected to the shaft, inter-engaging means between the plate and the drum to rotate same in a forward direction, a spring connected between the shaft and the drum, allowing rotation of the drum ahead of the plate and returning the drum until the inter-engaging means contact, there being a series of sockets in the drum, pins in the sockets, an electrically actuated signal controlled by the pins, a setting bar positioned adjacent the drum, having a series of holes therethrough, and means on the bar to engage the drum and hold same stationary, whereby the pins may be inserted through the holes in the bar into the sockets of the drum.

In testimony whereof I have signed my name to this specification.

CARL SCHENK.